United States Patent
Choi

(10) Patent No.: US 7,580,210 B2
(45) Date of Patent: Aug. 25, 2009

(54) METHOD, APPARATUS, AND MEDIUM FOR DETERMINING READ AND WRITE FREQUENCIES IN DATA STORING SYSTEMS AND A DISK DRIVE USING THE SAME

(75) Inventor: Ho-joong Choi, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 321 days.

(21) Appl. No.: 11/123,094

(22) Filed: May 6, 2005

(65) Prior Publication Data
US 2005/0248867 A1  Nov. 10, 2005

(30) Foreign Application Priority Data
May 7, 2004   (KR) ...................... 10-2004-0032203

(51) Int. Cl.
*G11B 27/36* (2006.01)
(52) U.S. Cl. .................. 360/31; 360/75; 360/77.02; 360/78.04
(58) Field of Classification Search ................ None
See application file for complete search history.

(56) References Cited

U.S. PATENT DOCUMENTS

| | | | | |
|---|---|---|---|---|
| 4,398,228 A | * | 8/1983 | Bauck ................. | 360/77.02 |
| 4,594,622 A | * | 6/1986 | Wallis .................. | 360/77.04 |
| 5,325,247 A | * | 6/1994 | Ehrlich et al. ........... | 360/78.09 |
| 5,661,615 A | * | 8/1997 | Waugh et al. .............. | 360/75 |
| 6,122,125 A | * | 9/2000 | Clare et al. ............. | 360/65 |
| 6,137,753 A | * | 10/2000 | Grimsley ................ | 369/44.32 |
| 6,275,346 B1 | * | 8/2001 | Kim et al. ............... | 360/31 |
| 6,278,565 B1 | * | 8/2001 | Yoon .................... | 360/46 |
| 6,417,982 B1 | * | 7/2002 | Ottesen et al. ........... | 360/77.02 |
| 6,574,065 B1 | * | 6/2003 | Sri-Jayantha et al. ...... | 360/75 |
| 6,690,534 B2 | * | 2/2004 | Ding et al. .............. | 360/77.02 |
| 7,031,094 B2 | * | 4/2006 | Chung .................... | 360/75 |
| 2001/0036027 A1 | * | 11/2001 | Min et al. ............... | 360/31 |

(Continued)

FOREIGN PATENT DOCUMENTS

KR   10-2002-0090533   12/2002

(Continued)

OTHER PUBLICATIONS

Korean Office Action issued Nov. 30, 2005 which corresponds to Korean Application No. 10-2004-0032203.

*Primary Examiner*—Hoa T Nguyen
*Assistant Examiner*—Dismery E Mercedes
(74) *Attorney, Agent, or Firm*—Staas & Halsey LLP

(57) ABSTRACT

A method of determining frequency bands of a data storage system and an apparatus using the same are provided. More particularly, a method of determining frequencies used for reading and writing data from and to a disk drive while avoiding frequencies that have adverse effects on a system and a disk drive using the same are provided. A method of determining read and write frequencies of the data storage system may include determining frequencies that have adverse effects on functions of the data storage system; selecting frequencies to be used when reading and writing data to and from a disk drive while avoiding the frequencies determined to have adverse effects on the functions of the data storage system.

22 Claims, 5 Drawing Sheets

U.S. PATENT DOCUMENTS

2002/0063999 A1* 5/2002 Huang et al. .............. 360/265.7
2002/0176192 A1* 11/2002 Chung ......................... 360/46
2002/0176196 A1 11/2002 Cyrusian
2003/0058558 A1* 3/2003 Ottesen et al. ................. 360/31
2004/0075929 A1* 4/2004 Shimizu et al. ............... 360/60

FOREIGN PATENT DOCUMENTS

KR 2002-90533 12/2002

* cited by examiner

METHOD, APPARATUS, AND MEDIUM FOR DETERMINING READ AND WRITE FREQUENCIES IN DATA STORING SYSTEMS AND A DISK DRIVE USING THE SAME

CROSS-REFERENCE TO RELATED APPLICATIONS

This application claims the benefit of Korean Patent Application No. 10-2004-0032203, filed on May 7, 2004, in the Korean Intellectual Property Office, the disclosure of which is incorporated herein in its entirety by reference.

BACKGROUND OF THE INVENTION

1. Field of the Invention

The present invention relates to a method of determining frequency bands of a data storage system and an apparatus using the same, and more particularly, to a method of determining frequencies for reading and writing data from and to a disk drive while avoiding frequencies that have adverse effects on the system and to a disk drive using the same.

2. Description of the Related Art

Data storage capacity and the processing speed of a hard disk drive (HDD), which is a data storage system, is rapidly increasing. Accordingly, as the track per inch (TPI) and the bit per inch (BPI), which denotes recording density, of HDDs increases, the frequency used for reading and writing data also increases. In addition, distribution of frequencies used in data read and write is also becoming varied as an adaptive zone layout (AZL) technology, adjusted to the physical characteristics of a head, is being used.

Read and write frequencies used in a hard disk drive 10 shown in FIG. 1 are in proportion to the BPI of a disk(s) 12 and the rotating speed of a spindle motor 14. Therefore, since an outer region at the disk(s) 12 has a higher recording density than an inner region of the disk(s) 12, the outer region of the disk(s) 12 uses a higher frequency than the inner circumference. In addition, by setting a recording density differently according to the characteristics of a transducer 16 (also known as a head), various frequencies are used. Accordingly, a distribution of read and write frequencies used in a conventional hard disk drive is as illustrated in FIG. 2.

However, when using regular and continuous read and write (R/W) frequencies as illustrated in FIG. 2, the read and write frequencies may overlap with operational frequencies such as a mechanical resonance frequency, a clock frequency used in a printing circuit board (not shown) of which the hard disk drive 10 is composed, or a communication frequency used to communicate with a host apparatus. A mechanical resonance frequency may be generated by a head-gimbal assembly 22 and a base 36, for example.

In this case, the read and write (R/W) frequencies increase the level of noise by combining with at least one of the operational frequencies such as the resonant frequency, the clock frequency, or the communication frequency, which adversely effects the operations (functions) of the data storage system. In addition, the composition of the combined frequency causes a problem in electromagnetic compatibility (EMC) approval of a set mounted in the hard disk drive 10. Furthermore, the hard disk drive 10 is mounted in a personal computer (PC) or an audio/video apparatus when used, thereby causing electro-magnetic interference (EMI) by weakening coverage of or amplifying harmful frequencies according to a structure of a chassis or a cable of the set the hard disk drive 10 is mounted in.

SUMMARY OF THE INVENTION

In aspects of the present invention provide a method of determining read and write frequencies for a data storage system by determining and not using frequencies with adverse effects on the data storage system, and a disk drive using the same.

According to an aspect of the present invention, there may be provided an exemplary method of determining read and write frequencies of a data storage system in a method of designing the data storage system. The method may include detecting frequencies that have adverse effects on functions of the data storage system; and selecting frequencies to be used when reading and writing data to and from a disk drive while avoiding the frequencies determined to have adverse effects on the functions of the data storage system.

The frequencies that have adverse effects on the functions of the data storage system may include a resonant frequency caused by a structural characteristic of the disk drive. The resonance frequency may be a mechanical resonance frequency generated by the structural characteristics of the disk drive, which may include a head-gimbal assembly and a base.

The frequencies that have adverse effects on the functions of the data storage system include frequencies higher than a predetermined strength emitted from a printing circuit board of the disk drive and a cable.

In aspects of the present invention, the selected frequencies do not inhibit electro-magnetic compatibility. The frequencies that have adverse effects on the functions of the data storage system may include a communication frequency used to communicate with a host device. The functions may include at least one of providing a clock signal and providing a communication frequency. The functions may include reading and writing from the data storage system According to another aspect of the present invention, there is provided an exemplary method of determining read and write frequencies of a data storage system in a method of designing the data storage system. The method may include embedding parameters related to a plurality of read and write frequency band selecting modes, which are used for selecting frequency bands used for reading and writing data to and from a disk drive in the disk drive; and selecting a read and write frequency band selecting mode with optimum characteristics from the plurality of read and write frequency band selecting modes to be used for the reading and writing of the data to and from the disk drive.

According to another aspect of the present invention, there is provided a disk drive of a disk storage device. The disk drive includes: a host interface transmitting/receiving data to/from a host device; a memory storing parameters designed to select frequencies for reading and writing data to and from the disk drive that do not have adverse effects on the data storage device; a controller controlling generation of the frequencies used for reading and writing data to and from the disk drive based on the parameters read from the memory, and controlling read and write processes; and a reading/writing circuit writing data received via the host interface to a disk or performing a data process to read data from the disk, using a frequency selected according to the read and write frequency band selecting mode selected by the controller. The frequencies that may have adverse effects on the data storage device may include a resonant frequency caused by a structural characteristic of the disk drive. The resonance frequency may be a mechanical resonance frequency generated by the structural characteristic of the disk drive, which includes a head-gimbal assembly and a base.

The frequencies that may have adverse effects on data storage device may include frequencies higher than a predetermined strength emitted from a printing circuit board of the disk drive and a cable.

In aspects of the present invention, the selected frequencies do not inhibit electro-magnetic compatibility. The frequencies that have adverse effects on the functions of the data storage system may include a communication frequency used to communicate with a host device. The functions may include reading and writing from the data storage system.

According to another aspect of the present invention, there is provided a disk drive of a disk storage device. The disk drive includes: a host interface transmitting/receiving data to/from with a host device; a memory storing parameters related to a plurality of read and write frequency band selecting modes to select different frequency bands for reading and writing data; a controller reading parameters related to the plurality of read and write frequency band selecting modes and setting one of the read and write frequency band selecting modes, and controlling reading and writing processes; and a reading/writing circuit writing data received via the host interface to a disk or performing a data process to read data from the disk, using a frequency selected according to the read and write frequency band selecting mode selected by the controller.

According to another aspect of the present invention, at least one computer readable medium storing instructions that control at least one processor to perform a method including detecting frequencies that have adverse effects on functions of the data storage system; and selecting frequencies to be used when reading and writing data to and from a disk drive while avoiding frequencies determined to have adverse effects on the functions of the data storage system.

The operation of selecting frequencies may further include embedding parameters related to a plurality of read and write frequency band selecting modes, which are used to read and write data to and from the disk drive; and selecting one mode from the plurality of modes, wherein the selected mode is used for reading and writing data to and from the disk drive, and the selected mode uses frequencies which do not have adverse effects on the functions of the data storage system. In aspects of the present invention, the selected frequencies do not inhibit electromagnetic compatibility.

According to another aspect of the present invention, there may be method of determining read and write frequencies of a data storage system, including detecting frequencies that have adverse effects on operational frequencies of the data storage system; and selecting frequencies to be used when reading and writing data to and from a disk drive while avoiding frequencies determined to have adverse effects on the operational frequencies of the data storage system. The operational frequencies may include at least one of mechanical resonance frequency, clock frequency, and communication frequency. In aspects of the present invention, the selected frequencies do not inhibit electromagnetic compatibility. The detected frequencies may be frequencies which would interfere with the operational frequencies In another aspect of the present invention, at least one computer readable medium storing instructions that control at least one processor to perform a method including detecting frequencies that have adverse effects on operational frequencies of the data storage system; and selecting frequencies to be used when reading and writing data to and from a disk drive while avoiding frequencies determined to have adverse effects on the operational frequencies of the data storage system. The operation of selecting frequencies may include embedding parameters related to a plurality of read and write frequency band selecting modes, which are used to read and write data to and from the disk drive; and selecting one mode from the plurality of modes, wherein the selected mode is used for reading and writing data to and from the disk drive, and the selected mode uses frequencies which do not have adverse effects on the operational frequencies of the data storage system. The operational frequencies may include at least one of mechanical resonance frequency, clock frequency, and communication frequency. The selected frequencies do not inhibit electromagnetic compatibility. The detected frequencies may be frequencies which would interfere with the operational frequencies

BRIEF DESCRIPTION OF THE DRAWINGS

These and/or other aspects, features, and advantages of the present invention will become more apparent and more readily appreciated by describing in detail exemplary embodiments thereof with reference to the attached drawings in which.

DETAILED DESCRIPTION OF THE PREFERRED EMBODIMENTS

Figure 1:
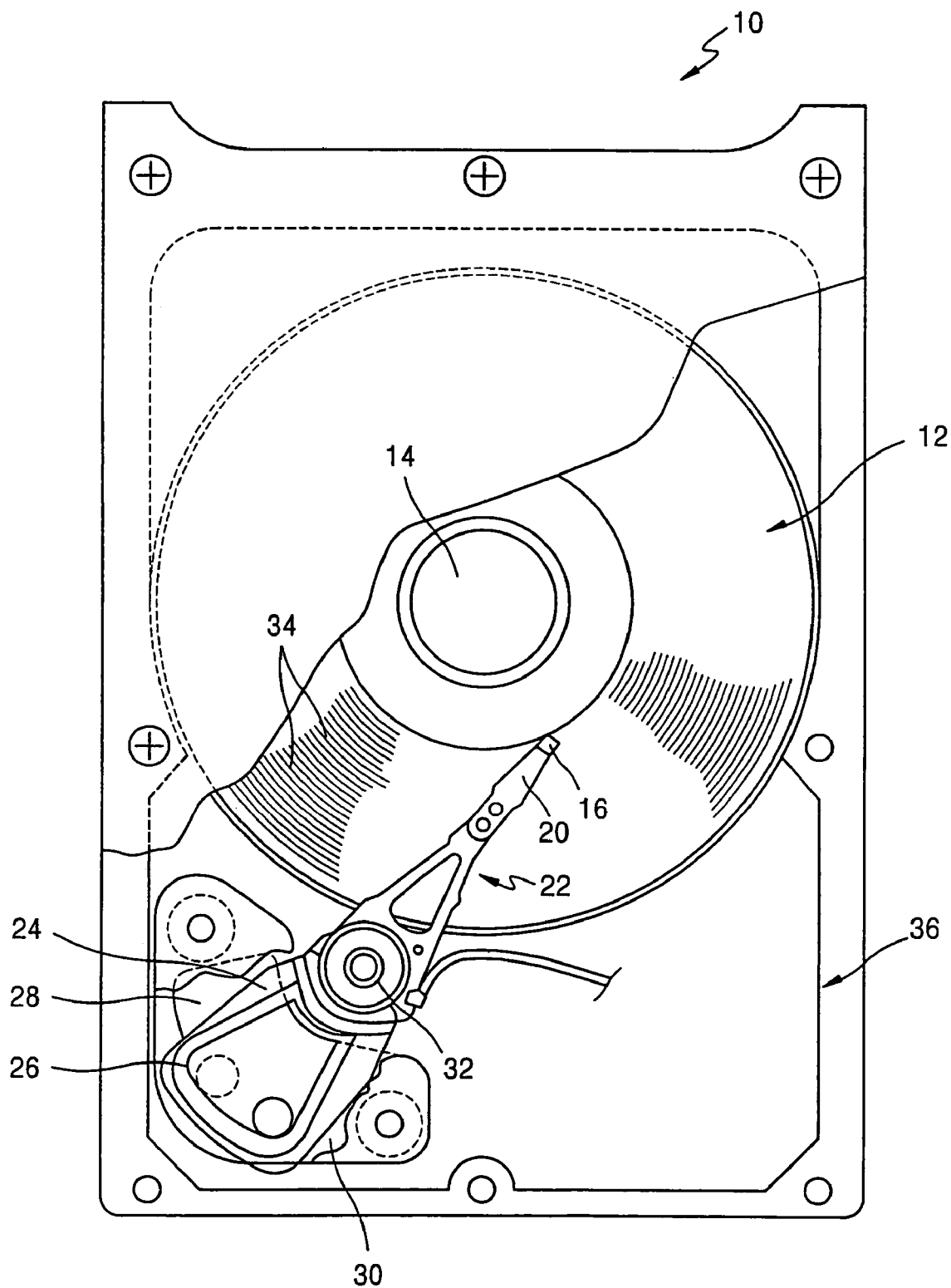
FIG. 1 is a top view of a hard disk drive in which the present invention may be adapted.
Figure 2:
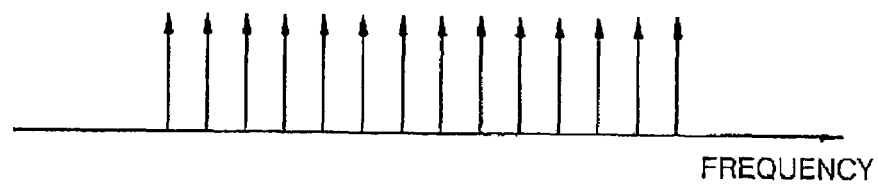
FIG. 2 is a view of a distribution of read and write frequencies of a conventional hard disk drive.

Reference will now be made in detail to exemplary embodiments of the present invention, examples of which are illustrated in the accompanying drawings, wherein like reference numerals refer to the like elements throughout.

FIG. 1 is a top view of a hard disk drive 10 in which the present invention may be adapted. The disk drive 10 includes at least one magnetic disk 12, which is rotated by a spindle motor 14. The disk drive 10 also includes a transducer 16 located adjacent to a surface of the disk 12.

The transducer 16 senses a magnetic field produced by disk 12 or magnetizes the disk 12, thereby reading or writing information from or to the disk 12. Typically, the transducer 16 is associated with the surface of the disk 12. Although a single transducer 16 is illustrated in FIG. 1, it should be understood that the transducer 16 includes a write transducer to magnetize the disk 12 and a separate read transducer to sense a magnetic field of the disk 12. The read transducer may be constructed from a magneto-resistive (MR) device. The transducer 16 is also commonly referred to as a head.

The transducer 16 may be combined with a slider 20. The slider 20 generates an air bearing between the transducer 16 and the surface of the disk 12. The slider 20 is coupled to a head-gimbal assembly 22. The head-gimbal assembly 22 is mounted on an actuator arm 24 having a voice coil 26. The voice coil 26 is adjacent to a magnetic assembly 28 which define a voice coil motor (VCM) 30. Current supplied to the voice coil 26 generates a torque which rotates the actuator arm 24 about a bearing assembly 32. By this rotation, the actuator arm 24 traverses the surface of the disk 12 and moves the transducer 16.

Information is usually stored within annular tracks of the disk 12. Each track 34 generally includes a plurality of sectors. Each sector includes a data field and an identification field. The identification field is composed of a gray code which identifies a sector and a track (cylinder). The transducer 16 traverses the surface of the disk 12 to read or write information from or to one of the tracks 34.

Figure 3:
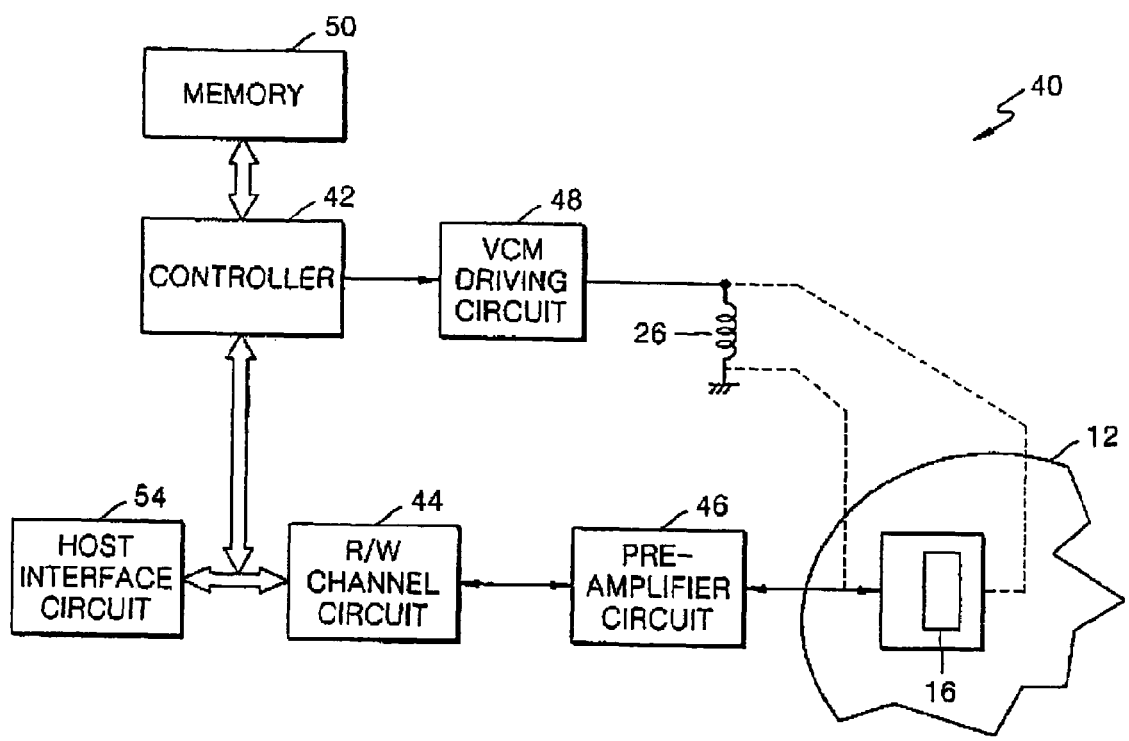
FIG. 3 is a block diagram of a circuit of a hard disk drive that uses a method of determining read and write frequencies in a data storage system, according to an exemplary embodiment of the present invention.

FIG. 3 is a block diagram of an electrical system (electrical circuit) 40, which can control a hard disk drive 10. The electrical system 40 includes a read/write (R/N) channel circuit 44 and a controller 42 coupled to the transducer 16 by a pre-amplifier circuit 46.

The controller 42 can be, for example, a digital signal processor (DSP), a microprocessor, a microcontroller, or other computing unit. The controller 45 controls the reading or writing of information from or to the disk 12 by the RAN channel 44, and generates a standard frequency signal for reading and writing according to a location of the reading or writing disk using parameters stored in a memory 50 in a recording or reproducing mode.

The read information is usually transmitted to a host interface circuit 54 from a R/W channel circuit 44. The host interface circuit 54 includes a buffer memory (not shown) and a control circuit (not shown) which provides an interface for the disk drive in a system, for example, a personal computer.

The controller 42 is also coupled to a VCM driving circuit 48 that supplies driving current to the voice coil 26. The controller 42 supplies a control signal to the VCM driving circuit 48 to control the excitation of the voice coil motor 30 and the movement of the transducer 16.

A firmware that controls the disk drive 10 and various parameters are stored in the memory 50. The parameters stored in the memory 50 include parameters used to select a frequency used for data reading and writing.

The parameters used to determine the frequency used for data reading and writing may be set using one of the following exemplary methods.

In a first exemplary method, components of a frequency that have an adverse effect on a data storage device are detected, and then parameters used to determine a frequency for data reading and writing that does not adversely affect the data storage device are selected.

In a second exemplary method, parameters related to a plurality of read and write frequency band deciding modes, which are used to select different bands for data reading and writing, reset separately, and then each of the parameters is stored according to the modes to which they apply.

In a general disk drive operating in a data read mode, the pre-amplifier circuit 46 amplifies an electric signal sensed by the transducer 16 from the disk 12 to enable signal processing afterwards. Then, the amplified signal is encoded into a digital signal, according to a phase locked standard frequency signal for reading, and converted into stream data by the R/W channel circuit 44. Then, the stream data is transmitted to a host device via the host interface circuit 54.

In a data write mode, the general disk drive receives data from the host device via the host interface circuit 54, and temporarily stores the data in an internal buffer (not shown) of the host interface circuit 54. Then, the data stored in the internal buffer is sequentially output, and the R/W channel circuit 44 converts the data into a binary data stream appropriate for a writing channel using a standard frequency signal for writing, which is generated according to information regarding a writing location of the disk 12. The binary data streams are amplified by the pre-amplifier circuit 46 and then written on the disk 12 by the transducer 16.

The frequencies of the standard frequency signals for reading and writing are selected according to a location on the disk 12 by applying parameters for selecting a frequency used for reading and writing data stored in the memory 50.

Figure 4:
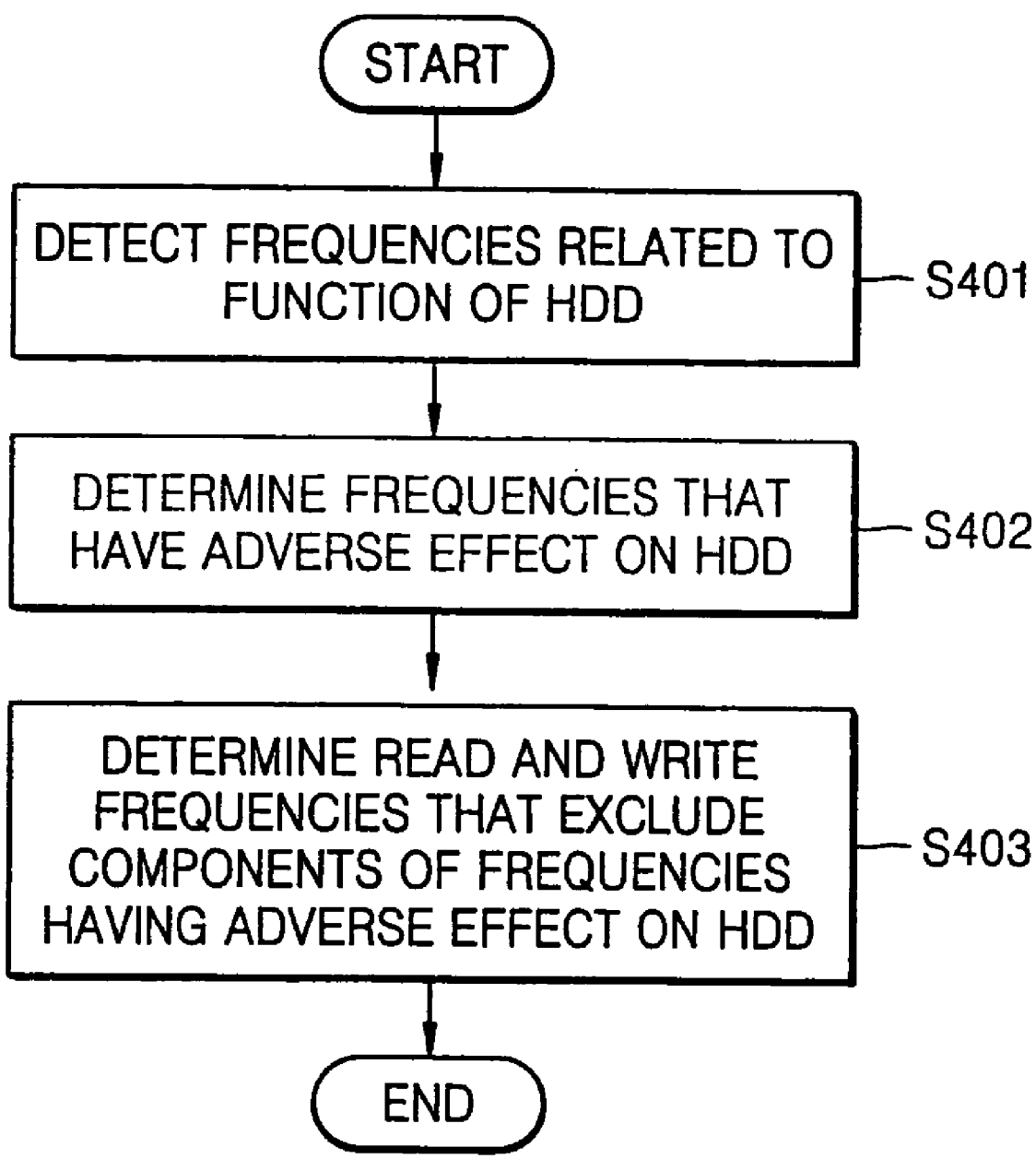
FIG. 4 is a flowchart illustrating a method of determining read and write frequencies of a data storage system, according to a first exemplary embodiment of the present invention.

Referring to FIG. 4, in an exemplary method of determining read and write frequencies of a data storage system according to a first exemplary embodiment of the present invention, frequencies related to functions of a hard disk drive are detected before setting read and write (R/W) frequency bands (Operation 401). The frequencies related to functions of a hard disk may be referred to as operational frequencies. The operational frequencies related to the functions of the hard disk drive include, for example, a mechanical resonance frequency of the hard disk drive, a clock frequency used in a printing circuit board, and a communication frequency used to communicate with a host device. The mechanical resonance frequency may be generated by a head-gimbal assembly 22 and a base 36, for example Then, among the detected frequencies, frequencies that have adverse effects on the functions of the hard disk drive and an apparatus in which the hard disk drive is embedded are determined based on a function test, the test including an electro-magnetic interference (EMI) test, or a simulation (Operation 402). Next, read and write frequencies are selected that exclude the components of frequencies that are determined to have adverse effects in Operation 402 (Operation 403).

Figure 6:
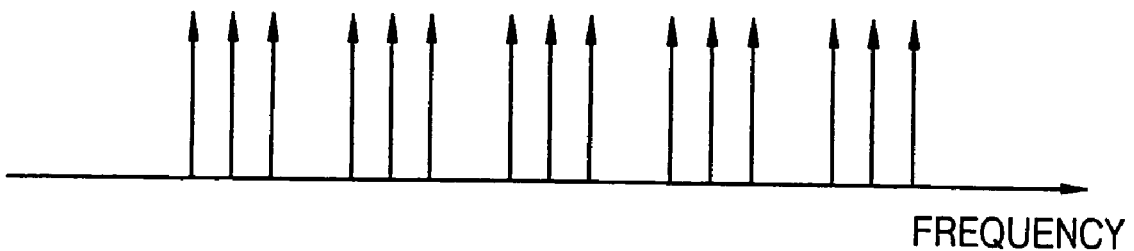
FIG. 6 is a view of a distribution of the read and write frequencies generated using the exemplary method illustrated in FIG. 4.

Accordingly, the distribution of read and write (R/W) frequencies excludes frequencies with adverse effects, as illustrated in FIG. 6.

Figure 5:
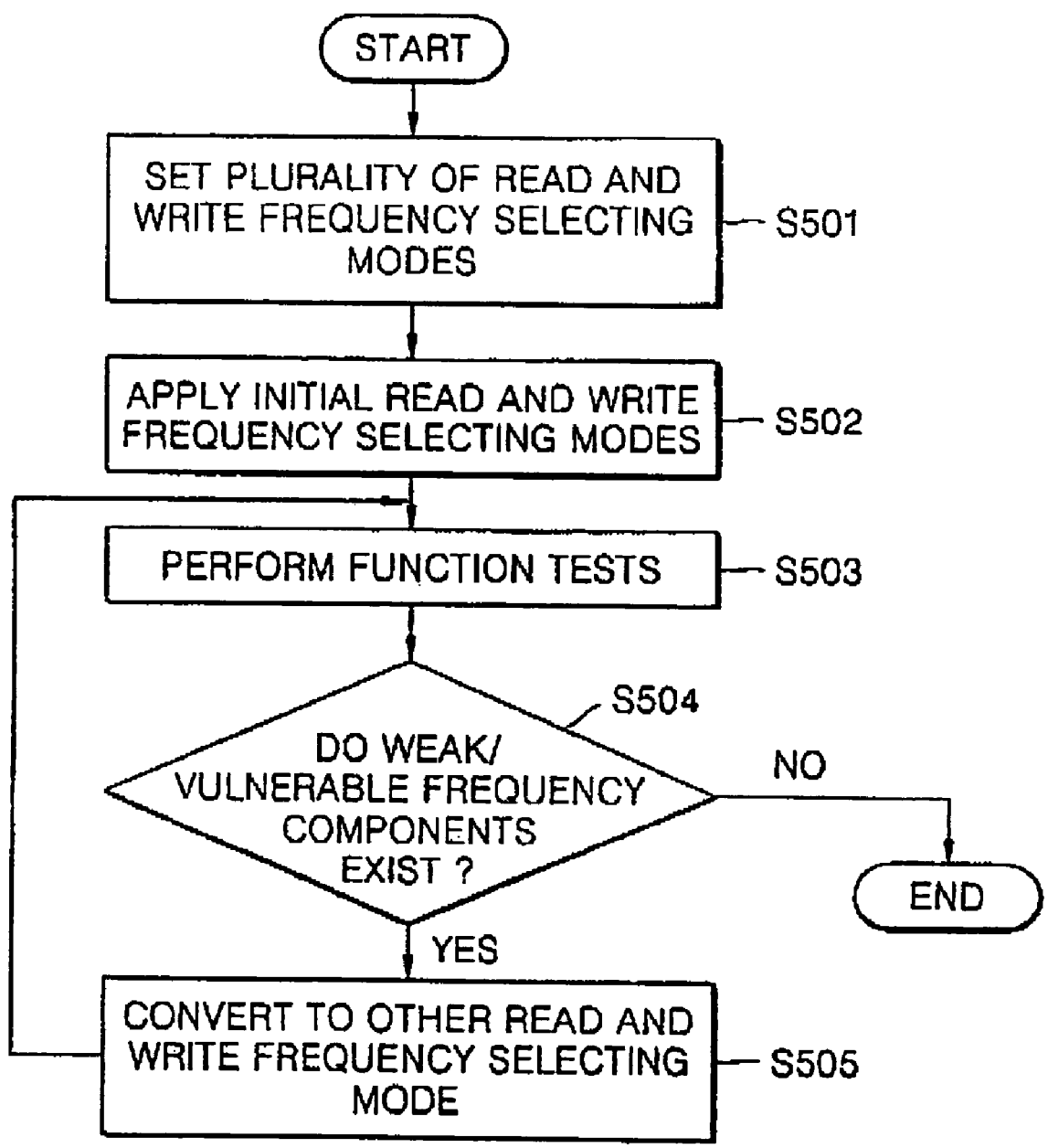
FIG. 5 a flowchart illustrating a method of determining read and write frequencies of a data storage system, according to a second exemplary embodiment of the present invention.
Figure 7A:
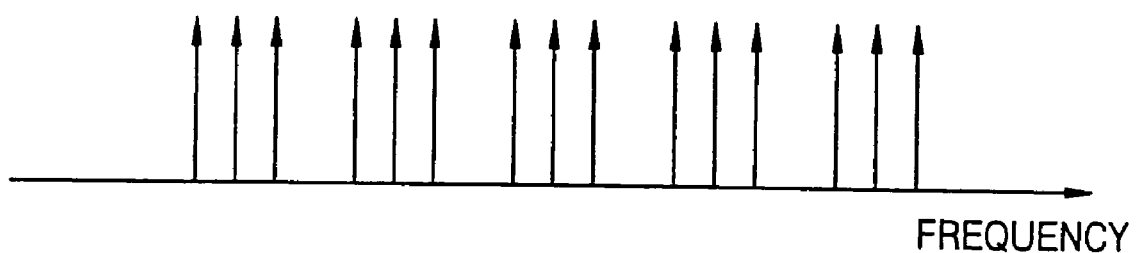
FIGS. 7A and 7B are views of a distribution of the read and write frequencies, according to multiple modes generated using the exemplary method illustrated in FIG. 5.
Figure 7B:
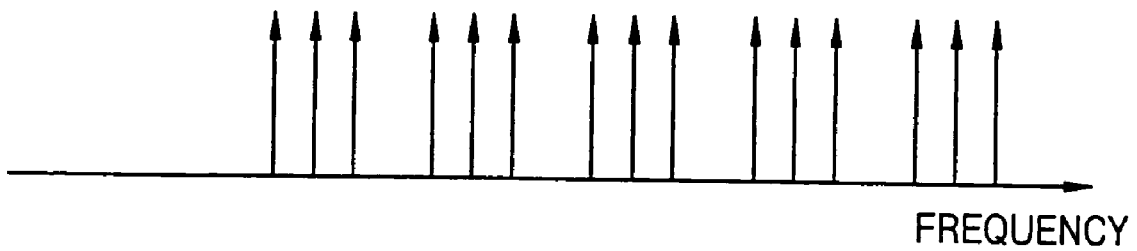

Next, referring to FIG. 5, in an exemplary method of determining read and write frequencies of a data storage system according to a second exemplary embodiment of the present invention. When designing a hard disk drive, a plurality of read and write frequency selecting modes are set (Operation 501). The read and write frequencies generated in the plurality of read and write frequency selecting modes are set by different parameters, so that different frequency bands are produced in each mode. For example, when the hard disk drive is designed with two read and write frequency selecting modes, parameters that set read and write frequencies are set in each mode, so that frequency bands generated in the read and write frequency selecting modes are different from each other, as illustrated in FIGS. 7A and 7B.

Next, one of the plurality of read and write frequency selecting modes is set as an initial read and write frequency selecting mode, and read and write frequencies are generated by applying corresponding parameters (Operation 502).

Then, function tests are performed on the hard disk drive (Operation 503). The function tests include an EMI test. Whether components are weak/vulnerable at a frequency included in the read and write frequency bands selected in the initial mode is determined from the function tests including the EMI test (Operation 504). That is, whether components of the frequency that have adverse effects on the functions of the hard disk drive and the apparatus in which hard disk drive is embedded exist is determined.

If the result shows that components are weak/vulnerable at a read and write frequency selected in the initial mode, the initial read and write frequency selecting mode is replaced by another read and write frequency selecting mode. After converting the parameters, operation 503 is performed again. However, if the result of operation 504 indicates that components are not weak/vulnerable at the frequencies selected in the initial mode, then the current read and write frequency selecting mode is maintained, and the process is terminated.

Through the methods of selecting read and write frequencies of a hard disk drive according to the exemplary embodiments of the present invention, frequency bands for read and write frequencies, excluding frequencies that have adverse effects on function test of the hard disk drive (for example, the EMI test), can be selected.

As described-above, the present invention improves the function including EMI characteristics of a disk drive and an apparatus in which the disk drive is embedded when selecting read and write frequencies of the disk drive by selecting read and write frequency bands that exclude frequencies that have adverse effects on the functions of the disk drive and the apparatus in which the disk drive is embedded, or by designing a disk drive able to generate a plurality of read and write frequency bands.

The present invention may be performed as, for example, methods, devices, and systems. When performed as software, the components of the present invention may be instructions, code segments, or one or more programs that necessarily perform essential jobs. The instructions, program, programs or the code segments may be stored in a processor readable medium, or may be transmitted by a computer data signal or a computer data signal combined with a carrier wave in a communications network or a transmission medium. The processor readable medium includes all media that can store or transmit information, for example, electric circuit, semiconductor memory device, read-only memory (ROM), flash memory, erasable ROM, CD-ROM, DVD-ROM, floppy disk, optical disk, hard disk, optical fiber medium, radio frequency (RF) network, any wired, wireless or wired and wireless network. The computer data signal includes all signals that can be transmitted via a transmission medium, for example, electronic network channel, optical fiber, air, electronic device, RF network, any wired, wireless or wired and wireless network.

While the present invention has been particularly shown and described with reference to exemplary embodiments thereof, it will be appreciated by those of ordinary skill in the art that various changes in form and details may be made to these exemplary embodiments without departing from the principles and spirit of the present invention, the scope of which is defined in the claims and their equivalents.

What is claimed is:

1. A method of determining read and write frequencies of a data storage system, comprising: detecting frequencies that have adverse effects on functions of the data storage system by utilizing a function test comprising at least a test for determining electro-magnetic interference (EMI); and selecting frequencies to be used when reading and writing data to and from a disk drive, wherein the frequencies are selected using predetermined parameters stored in a memory, while avoiding frequencies determined to have adverse effects on the functions of the data storage system, wherein the frequencies that have adverse effects on the functions of the data storage system include a resonant frequency caused by a structural characteristic of the disk drive.

2. The method of determining read and write frequencies of claim 1, wherein the frequencies that have adverse effects on the functions of the data storage system include frequencies higher than a predetermined strength emitted from a printing circuit board of the disk drive and a cable.

3. The method of determining read and write frequencies of claim 1, wherein the selected frequencies do not inhibit electro-magnetic compatibility.

4. The method of determining read and write frequencies of claim 1, wherein the frequencies that have adverse effects on the functions of the data storage system include a communication frequency used to communicate with a host device.

5. The method of determining read and write frequencies of claim 1, wherein the functions include at least one of providing a clock signal and providing a communication frequency.

6. The method of determining read and write frequencies of claim 1, wherein the functions include reading and writing from the data storage system.

7. The method of determining read and write frequencies of claim 1, wherein the resonance frequency is a mechanical resonance frequency generated by the structural characteristic of the disk drive, which includes a head-gimbal assembly and a base.

8. A method of determining read and write frequencies of a data storage system comprising:
   testing for frequencies that have adverse effects on functions of a disk drive by utilizing a function test comprising at least a test for determining electro-magnetic interference (EMI);
   embedding, in a memory, predetermined parameters related to a plurality of read and write frequency band selecting modes, which are used for selecting frequency bands used for reading and writing data to and from the disk drive in the disk drive; and
   selecting a read and write frequency band selecting mode with optimum characteristics using the embedded predetermined parameters of the plurality of read and write frequency band selecting modes to be used for the reading and writing of the data to and from the disk drive while avoiding frequencies determined to have adverse effects on functions of the data storage system,
   wherein the frequencies that have adverse effects on the functions of the data storage system include a resonant frequency caused by a structural characteristic of the disk drive.

9. A disk drive of a disk storage device, the disk drive comprising: a host interface transmitting/receiving data to/from a host device; a memory storing predetermined parameters designed to select frequencies for reading and writing data to and from the disk drive wherein the frequencies selected do not have adverse effects on the data storage device; a controller controlling generation of the frequencies used for reading and writing data to and from the disk drive based on the predetermined parameters read from the memory, and controlling read and write processes; and a reading/writing circuit writing data received via the host interface to a disk or performing a data process to read data from the disk, using a frequency selected according to the read and write frequency band selecting mode which is selected by the controller, wherein the frequencies that have adverse effects on the data storage device include a resonant frequency caused by a structural characteristic of the disk drive and frequencies drive.

10. The disk drive of claim 9, wherein the frequencies that have adverse effects on the data storage device include frequencies higher than a predetermined strength emitted from a printing circuit board of the disk drive and a cable.

11. The disk drive of claim 9, wherein the selected frequencies do not inhibit electro-magnetic compatibility.

12. The disk drive of claim 9, wherein the frequencies that have adverse effects on the functions of the data storage system include a communication frequency used to communicate with a host device.

13. The disk drive of claim 9 wherein the functions include reading and writing from the data storage system.

14. The disk drive of claim 9, wherein the resonance frequency is a mechanical resonance frequency generated by the structural characteristic of the disk drive, which includes a head-gimbal assembly and a base.

15. A disk drive of a disk storage device, the disk drive comprising:
   a host interface transmitting/receiving data to/from with a host device;
   a memory storing predetermined parameters related to a plurality of read and write frequency band selecting modes utilized to select different frequency bands for reading and writing data;
   a controller reading the predetermined parameters related to the plurality of read and write frequency band selecting modes and setting one of the read and write frequency band selecting modes, and controlling reading and writing processes while avoiding frequencies determined to have adverse effects on functions of the disk storage system; and
   a reading/writing circuit writing data received via the host interface to a disk or performing a data process to read data from the disk, using a frequency selected according to the read and write frequency band selecting mode selected by the controller,
   wherein the frequencies that have adverse effects on the data storage device include a resonant frequency caused by a structural characteristic of the disk drive.

16. A computer readable medium storing instructions that control at least one processor to perform a method comprising: detecting frequencies that have adverse effects on functions of a data storage system by utilizing-at-least a function test comprising at least a test for determining electro-magnetic interference (EMI); and selecting frequencies to be used when reading and writing data to and from a disk drive, wherein the frequencies are selected using predetermined parameters stored in a memory, while avoiding frequencies determined to have adverse effects on the functions of the data storage system, wherein the frequencies that have adverse effects on the data storage device include a resonant frequency caused by a structural characteristic of the disk drive and frequencies determined based on the function test for determining electro-magnetic interference (EMI) drive.

17. The at least one computer readable medium of claim 16, wherein selecting frequencies further comprises:
   embedding parameters related to a plurality of read and write frequency band selecting modes, which are used to read and write data to and from the disk drive; and
   selecting one mode from the plurality of modes, wherein the selected mode is used for reading and writing data to and from the disk drive, and the selected mode uses frequencies which do not have adverse effects on the functions of the data storage system.

18. The at least one computer readable medium of claim 16, wherein the selected frequencies do not inhibit electro-magnetic compatibility.

19. A method of determining read and write frequencies of a data storage system, comprising: detecting frequencies that have adverse effects on operational frequencies of the data storage system by utilizing at least a function test for determining electro-magnetic interference (EMI); and selecting frequencies to be used when reading and writing data to and from a disk drive, wherein the frequencies are selected using predetermined parameters stored in a memory, while avoiding frequencies determined to have adverse effects on the operational frequencies of the data storage system and avoiding frequencies determined to have adverse effects on functions of the data storage system, wherein the frequencies that have adverse effects on the operational frequencies and functions of the data storage device include a resonant frequency caused by a structural characteristic of the disk drive and frequencies determined based on the function test for determining electro-magnetic interference (EMI).

20. The method of determining read and write frequencies of claim 19, wherein the operational frequencies include at least one of mechanical resonance frequency, clock frequency, and communication frequency.

21. The method of determining read and write frequencies of claim 19, wherein the selected frequencies do not inhibit electro-magnetic compatibility.

22. The method of determining read and write frequencies of claim 19, wherein the detected frequencies are frequencies which would interfere with the operational frequencies.

* * * * *

UNITED STATES PATENT AND TRADEMARK OFFICE
CERTIFICATE OF CORRECTION

PATENT NO. : 7,580,210 B2
APPLICATION NO. : 11/123094
DATED : August 25, 2009
INVENTOR(S) : Ho-joong Choi It is certified that error appears in the above-identified patent and that said Letters Patent is hereby corrected as shown below:

Column 8, Lines 57-58, after "disk" delete "drive and frequencies".

Column 9, Line 37, after "utilizing" delete "-at-least".

Column 10, Lines 1-3, after "disk" delete "drive and frequencies determined based on the function test for determining electro-magnetic interference (EMI)".

Signed and Sealed this

Twenty-fourth Day of November, 2009

David J. Kappos
*Director of the United States Patent and Trademark Office*